(12) United States Patent
Nakai

(10) Patent No.: US 11,330,144 B2
(45) Date of Patent: May 10, 2022

(54) IMAGE FORMING METHOD WITH CALIBRATION PROCESSING, AND NON-TRANSITORY COMPUTER-READABLE RECORDING MEDIUM HAVING STORED THEREON IMAGE FORMING PROGRAM OF THE SAME

(71) Applicant: KYOCERA Document Solutions Inc., Osaka (JP)

(72) Inventor: Jun Nakai, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/105,693

(22) Filed: Nov. 27, 2020

(65) Prior Publication Data

US 2021/0160381 A1    May 27, 2021

(30) Foreign Application Priority Data

Nov. 27, 2019    (JP) .............................. JP2019-214486

(51) Int. Cl.
*H04N 1/40* (2006.01)
*H04N 1/405* (2006.01)
*H04N 1/00* (2006.01)
*H04N 1/60* (2006.01)

(52) U.S. Cl.
CPC ......... *H04N 1/405* (2013.01); *H04N 1/00068* (2013.01); *H04N 1/00087* (2013.01); *H04N 1/60* (2013.01)

(58) Field of Classification Search
CPC combination set(s) only.
See application file for complete search history.

(56) References Cited

U.S. PATENT DOCUMENTS 8,331,738 B2 *  12/2012  Hosier .................. H04N 1/113
                                                      358/444
9,019,551 B2 *  4/2015  Hayashi ................. H04N 1/506
                                                      358/1.18

FOREIGN PATENT DOCUMENTS

JP          2009-027683          2/2009

* cited by examiner

*Primary Examiner* — Barbara D Reinier
(74) *Attorney, Agent, or Firm* — Lex IP Meister, PLLC

(57) ABSTRACT

In one embodiment, an image forming apparatus includes an image region dividing portion which determines, within an image formable width, an image boundary position that matches with one of matrix boundaries corresponding to boundaries between dither matrices, and sets image adjustment regions. The image forming apparatus also includes a correction processing portion which uses common calibration data to determine imaginary adjustment regions positioned closest to the image adjustment regions, respectively, in a main scanning direction, and uses a correction amount for the determined imaginary adjustment region to correct the position in a sub-scanning direction, thereby reducing a color shift. The image region dividing portion determines the image boundary position by applying a rounding function to a value obtained by dividing the number of pixels constituting a width of the image adjustment region by the number of pixels in one cycle of the dither matrix in the main scanning direction.

3 Claims, 15 Drawing Sheets

IMAGE REGION DIVISION PROCESSING

REGISTRATION ADJUSTMENT PROCESSING

IMAGE FORMABLE WIDTH DIVIDED STATE

EXAMPLE OF SCANNING LINE INCLINATION

DEVIATION AMOUNT OF EACH IMAGE REGION

CORRECTION AMOUNT OF EACH IMAGE REGION

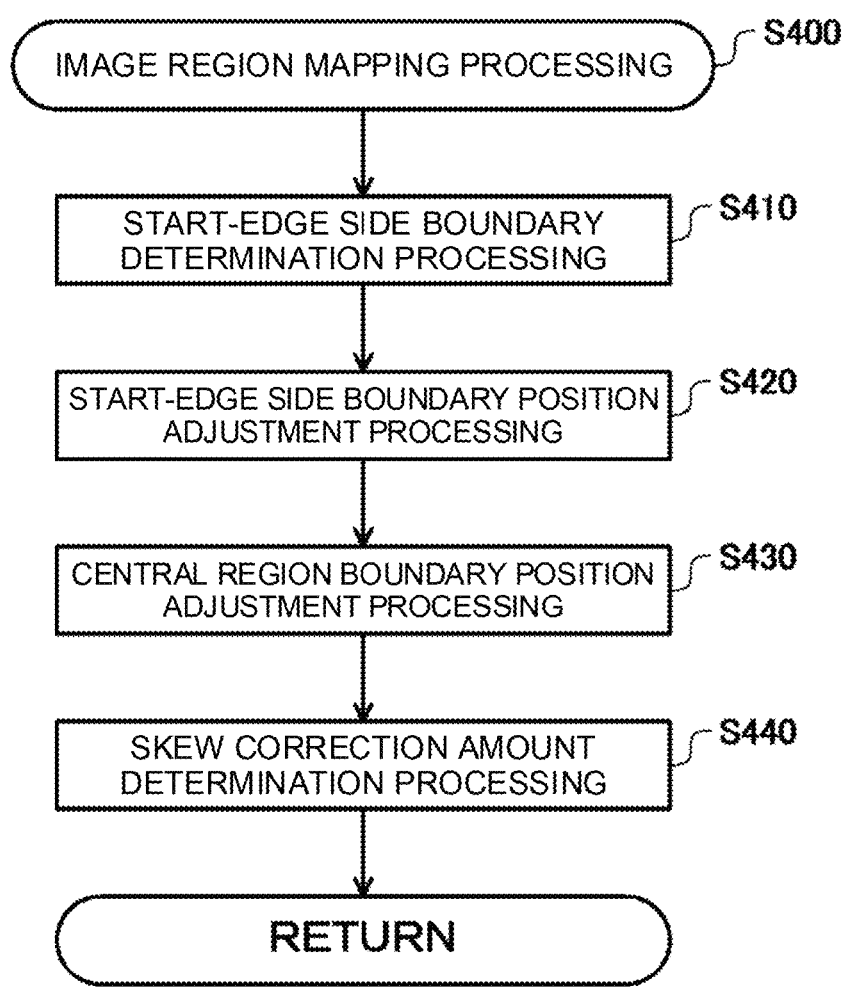

FIG. 10A

CALCULATION FORMULA FOR START-EDGE SIDE BOUNDARY POSITION DETERMINATION $k_0 = \text{Int}(W/L_0) + 1 \cdot \cdot \cdot \text{F1}$

FIG. 10B

CALCULATION FORMULA FOR START-EDGE SIDE BOUNDARY POSITION ADJUSTMENT

WHEN $k < k_0$ $L = L_0 \cdot \cdot \cdot \text{F2}$

WHEN $k = k_0$ $L_k = X + \text{Round}\{(L_0 - X)/m\} \times m \cdot \cdot \cdot \text{F3}$ IN THE ABOVE FORMULA, $X = W \bmod L_0$

FIG. 10C

CALCULATION FORMULA FOR BOUNDARY POSITION ADJUSTMENT

WHEN $k > k_0$ $L_k = \text{Round}\left(\dfrac{(k - k_0 + 1) \times L_0 - \sum_{i=k_0}^{k-1} L_i}{m}\right) \times m \cdot \cdot \cdot \text{F4}$

FIG. 11

COMPARATIVE EXAMPLE

T1

| IMAGE SIZE | IMAGE WIDTH (mm) | IMAGE WIDTH (dots) W | x | K0 | TOTAL WIDTH (dots) |
|---|---|---|---|---|---|
| SRA3 | 320 | 30236 | 1266 | 1 | 32768 |
| A3R | 297 | 28063 | 305 | 2 | 32768 |
| B4R | 257 | 24283 | 147 | 3 | 32768 |
| A4R | 210 | 19843 | 319 | 4 | 32768 |
| A4E | 297 | 28063 | 306 | 2 | 32768 |
| B5R | 182 | 17197 | 1642 | 4 | 32768 |
| B5E | 148 | 13984 | 1200 | 5 | 32768 |
| A5R | 148 | 13984 | 1200 | 5 | 32768 |
| A5E | 210 | 19843 | 319 | 4 | 32768 |
| B6R | 128 | 12094 | 97 | 6 | 32768 |
| A6R | 105 | 9921 | 1184 | 6 | 32768 |

T2c

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | 1986 | 2160 | 1920 | 2160 | 1920 | 2160 | 1920 | 2160 | 2160 | 1920 | 2160 | 1920 | 2160 | 1920 | 2160 | 1982 |
| A3R | 2048 | 1985 | 1920 | 2160 | 1920 | 2160 | 1920 | 2160 | 2160 | 1920 | 2160 | 1920 | 2160 | 1920 | 2160 | 2095 |
| B4R | 2048 | 2048 | 2067 | 2160 | 1920 | 2160 | 1920 | 2160 | 2160 | 1920 | 2160 | 1920 | 2160 | 1920 | 2160 | 1885 |
| A4R | 2048 | 2048 | 2048 | 1999 | 1920 | 1920 | 1920 | 2160 | 2160 | 1920 | 2160 | 1920 | 2160 | 1920 | 2160 | 2065 |
| A4E | 2048 | 1985 | 1920 | 2160 | 1920 | 2160 | 1920 | 2160 | 2160 | 1920 | 2160 | 1920 | 2160 | 1920 | 2160 | 2095 |
| B5R | 2048 | 2048 | 2048 | 2122 | 1920 | 2160 | 1920 | 2160 | 2160 | 1920 | 2160 | 1920 | 2160 | 1920 | 2160 | 1942 |
| B5E | 2048 | 2048 | 2048 | 2048 | 2160 | 2160 | 1920 | 2160 | 2160 | 1920 | 2160 | 1920 | 2160 | 1920 | 2160 | 1776 |
| A5R | 2048 | 2048 | 2048 | 2048 | 2160 | 2160 | 1920 | 2160 | 2160 | 1920 | 2160 | 1920 | 2160 | 1920 | 2160 | 1776 |
| A5E | 2048 | 2048 | 2048 | 1999 | 1920 | 1920 | 1920 | 2160 | 2160 | 1920 | 2160 | 1920 | 2160 | 1920 | 2160 | 2065 |
| B6R | 2048 | 2048 | 2048 | 2048 | 2048 | 2017 | 1920 | 2160 | 2160 | 1920 | 2160 | 1920 | 2160 | 1920 | 2160 | 2031 |
| A6R | 2048 | 2048 | 2048 | 2048 | 2048 | 2144 | 1920 | 2160 | 2160 | 1920 | 2160 | 1920 | 2160 | 1920 | 2160 | 1904 |

FIG. 12

COMPARATIVE EXAMPLE

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | -62 | 50 | -78 | 34 | -94 | 18 | -110 | 2 | 114 | -14 | 98 | -30 | 82 | -46 | 66 | 0 |
| A3R | 0 | -63 | -191 | -79 | -207 | -95 | -223 | -111 | 1 | -127 | -15 | -143 | -31 | -159 | -47 | 0 |
| B4R | 0 | 0 | 19 | 131 | 3 | 115 | -13 | 99 | 211 | 83 | 195 | 67 | 179 | 51 | 163 | 0 |
| A4R | 0 | 0 | 0 | -49 | -177 | -65 | -193 | -81 | 31 | -97 | 15 | -113 | -1 | -129 | -17 | 0 |
| A4E | 0 | -63 | -191 | -79 | -207 | -95 | -223 | -111 | 1 | -127 | -15 | -143 | -31 | -159 | -47 | 0 |
| B5R | 0 | 0 | 0 | 74 | -54 | 58 | -70 | 42 | 154 | 26 | 138 | 10 | 122 | -6 | 106 | 0 |
| B5E | 0 | 0 | 0 | 0 | 112 | 224 | 96 | 208 | 320 | 192 | 304 | 176 | 288 | 160 | 272 | 0 |
| A5R | 0 | 0 | 0 | 0 | 112 | 224 | 96 | 208 | 320 | 192 | 304 | 176 | 288 | 160 | 272 | 0 |
| A5E | 0 | 0 | 0 | -49 | -177 | -65 | -193 | -81 | 31 | -97 | 15 | -113 | -1 | -129 | -17 | 0 |
| B6R | 0 | 0 | 0 | 0 | 0 | -31 | -159 | -47 | 65 | -63 | 49 | -79 | 33 | -95 | 17 | 0 |
| A6R | 0 | 0 | 0 | 0 | 0 | 96 | -32 | 80 | 192 | 64 | 176 | 48 | 160 | 32 | 144 | 0 |

T3c

EMBODIMENT

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | -62 | 50 | -78 | 34 | -94 | 18 | -110 | 2 | 114 | -14 | 98 | -30 | 82 | -46 | 66 | 0 |
| A3R | 0 | -63 | 49 | -79 | 33 | -95 | 17 | -111 | 1 | 113 | -15 | 97 | -31 | 81 | -47 | 0 |
| B4R | 0 | 0 | 19 | -109 | 3 | 115 | -13 | 99 | -29 | 83 | -45 | 67 | -61 | 51 | -77 | 0 |
| A4R | 0 | 0 | 0 | -49 | 63 | -65 | 47 | -81 | 31 | -97 | 15 | -113 | -1 | 111 | -17 | 0 |
| A4E | 0 | -63 | 49 | -79 | 33 | -95 | 17 | -111 | 1 | 113 | -15 | 97 | -31 | 81 | -47 | 0 |
| B5R | 0 | 0 | 0 | 74 | -54 | 58 | -70 | 42 | -88 | 26 | -102 | 10 | -118 | -6 | 106 | 0 |
| B5E | 0 | 0 | 0 | 0 | 112 | -16 | 96 | -32 | 80 | -48 | 64 | -64 | 48 | -80 | 32 | 0 |
| A5R | 0 | 0 | 0 | 0 | 112 | -16 | 96 | -32 | 80 | -48 | 64 | -64 | 48 | -80 | 32 | 0 |
| A5E | 0 | 0 | 0 | -49 | 63 | -65 | 47 | -81 | 31 | -97 | 15 | -113 | -1 | 111 | -17 | 0 |
| B6R | 0 | 0 | 0 | 0 | 0 | -31 | 81 | -47 | 65 | -63 | 49 | -79 | 33 | -95 | 17 | 0 |
| A6R | 0 | 0 | 0 | 0 | 0 | 96 | -32 | 80 | -48 | 64 | -64 | 48 | -80 | 32 | -96 | 0 |

EMBODIMENT

Table T1:

| IMAGE SIZE | IMAGE WIDTH (mm) | IMAGE WIDTH (dots) W | x | N0 | TOTAL WIDTH (dots) |
|---|---|---|---|---|---|
| SRA3 | 320 | 30236 | 1266 | 1 | 32768 |
| A3R | 297 | 28063 | 2353 | 2 | 32768 |
| B4R | 257 | 24283 | 4243 | 3 | 32768 |
| A4R | 210 | 19843 | 6463 | 4 | 32768 |
| A4E | 297 | 28063 | 2353 | 2 | 32768 |
| B5R | 182 | 17197 | 7786 | 4 | 32768 |
| B5E | 148 | 13984 | 9392 | 5 | 32768 |
| A5R | 148 | 13984 | 9392 | 5 | 32768 |
| A5E | 210 | 19843 | 6463 | 4 | 32768 |
| B6R | 128 | 12094 | 10337 | 6 | 32768 |
| A6R | 105 | 9921 | 11424 | 6 | 32768 |

Table T2:

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | 1986 | 2160 | 1920 | 2160 | 1920 | 2160 | 1920 | 2160 | 1920 | 2160 | 2160 | 1920 | 2160 | 1920 | 2160 | 1982 |
| A3R | 2048 | 1985 | 2160 | 1920 | 2160 | 1920 | 2160 | 1920 | 2160 | 1920 | 1920 | 2160 | 1920 | 2160 | 1920 | 2095 |
| B4R | 2048 | 2048 | 2067 | 2160 | 1920 | 2160 | 1920 | 2160 | 1920 | 2160 | 1920 | 2160 | 1920 | 2160 | 1920 | 2125 |
| A4R | 2048 | 2048 | 2048 | 1999 | 2160 | 1920 | 2160 | 1920 | 2160 | 2160 | 1920 | 2160 | 1920 | 2160 | 1920 | 2065 |
| A4E | 2048 | 1985 | 2160 | 1920 | 2160 | 1920 | 2160 | 1920 | 2160 | 1920 | 1920 | 2160 | 1920 | 2160 | 1920 | 2095 |
| B5R | 2048 | 2048 | 2160 | 2122 | 1920 | 2160 | 1920 | 2160 | 1920 | 2160 | 2160 | 1920 | 2160 | 1920 | 2160 | 1942 |
| B5E | 2048 | 2048 | 2048 | 2048 | 2048 | 1920 | 2160 | 1920 | 2160 | 1920 | 2160 | 1920 | 2160 | 1920 | 2160 | 2016 |
| A5R | 2048 | 2048 | 2048 | 2048 | 2048 | 1920 | 2160 | 1920 | 2160 | 1920 | 2160 | 1920 | 2160 | 1920 | 2160 | 2016 |
| A5E | 2048 | 2048 | 2048 | 1999 | 2160 | 1920 | 2160 | 1920 | 2160 | 2160 | 1920 | 2160 | 1920 | 2160 | 1920 | 2065 |
| B6R | 2048 | 2048 | 2048 | 2048 | 2048 | 2017 | 1920 | 2160 | 1920 | 2160 | 1920 | 2160 | 1920 | 2160 | 1920 | 2031 |
| A6R | 2048 | 2048 | 2048 | 2048 | 2048 | 2144 | 2160 | 1920 | 2160 | 1920 | 2160 | 1920 | 2160 | 1920 | 2160 | 2144 |

FIG. 14

AMOUNT OF ADJUSTMENT REDUCTION ACHIEVED BY EMBODIMENT
(DIFFERENCE OF ABSOLUTE VALUES)

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | | | | | | | | | | | | | | | | |
| A3R(三) | 0 | 0 | -142 | 0 | -174 | 0 | -206 | 0 | 0 | -14 | 0 | -46 | 0 | -78 | 0 | 0 |
| B4R(三) | 0 | 0 | 0 | -22 | 0 | 0 | 0 | 0 | -182 | 0 | -150 | 0 | -118 | 0 | -86 | 0 |
| A4R(三) | 0 | 0 | 0 | 0 | -114 | 0 | -146 | 0 | 0 | 0 | 0 | 0 | 0 | -18 | 0 | 0 |
| A4E(三) | 0 | 0 | -142 | 0 | -174 | 0 | -206 | 0 | 0 | -14 | 0 | -46 | 0 | -78 | 0 | 0 |
| B6R(三) | 0 | 0 | 0 | 0 | 0 | 0 | 0 | 0 | -68 | 0 | -36 | 0 | -4 | 0 | 0 | 0 |
| B5E | 0 | 0 | 0 | 0 | 0 | -208 | 0 | -176 | -240 | -144 | -240 | -112 | -240 | -80 | -240 | 0 |
| A5R | 0 | 0 | 0 | 0 | 0 | -208 | 0 | -176 | -240 | -144 | -240 | -112 | -240 | -80 | -240 | 0 |
| A5E | 0 | 0 | 0 | 0 | -114 | 0 | -146 | 0 | 0 | 0 | 0 | 0 | 0 | -18 | 0 | 0 |
| B6R | 0 | 0 | 0 | 0 | 0 | 0 | -78 | 0 | 0 | 0 | 0 | 0 | 0 | 0 | 0 | 0 |
| A6R | 0 | 0 | 0 | 0 | 0 | 0 | 0 | 0 | -144 | 0 | -112 | 0 | -80 | 0 | -48 | 0 |

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | -62 | 112 | -128 | 112 | -128 | 112 | -128 | 112 | 112 | -128 | 112 | -128 | 112 | -128 | 112 | -66 |
| A3R | 0 | -63 | -128 | 112 | -128 | 112 | -128 | 112 | 112 | -128 | 112 | -128 | 112 | -128 | 112 | 47 |
| B4R | 0 | 0 | 19 | 112 | -128 | 112 | -128 | 112 | 112 | -128 | 112 | -128 | 112 | -128 | 112 | -163 |
| A4R | 0 | 0 | 0 | -49 | -128 | 112 | -128 | 112 | 112 | -128 | 112 | -128 | 112 | -128 | 112 | 17 |
| A4E | 0 | -63 | -128 | 112 | -128 | 112 | -128 | 112 | 112 | -128 | 112 | -128 | 112 | -128 | 112 | 47 |
| B5R | 0 | 0 | 0 | 74 | -128 | 112 | -128 | 112 | 112 | -128 | 112 | -128 | 112 | -128 | 112 | -106 |
| B5E | 0 | 0 | 0 | 0 | 0 | 112 | -128 | 112 | 112 | -128 | 112 | -128 | 112 | -128 | 112 | -272 |
| A5R | 0 | 0 | 0 | 0 | 112 | -128 | 112 | -128 | 112 | -128 | 112 | -128 | 112 | -128 | 112 | -272 |
| A5E | 0 | 0 | 0 | -49 | -128 | 112 | -128 | 112 | 112 | -128 | 112 | -128 | 112 | -128 | 112 | 17 |
| B6R | 0 | 0 | 0 | 0 | 0 | -31 | -128 | 112 | 112 | -128 | 112 | -128 | 112 | -128 | 112 | -17 |
| A6R | 0 | 0 | 0 | 0 | 0 | 96 | -128 | 112 | 112 | -128 | 112 | -128 | 112 | -128 | 112 | -144 |

T5:

| IMAGE SIZE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SRA3 | -62 | 112 | -128 | 112 | -128 | 112 | -128 | 112 | 112 | -128 | 112 | -128 | 112 | -128 | 112 | -66 |
| A3R | 0 | -63 | 112 | -128 | 112 | -128 | 112 | -128 | 112 | -128 | 112 | -128 | 112 | 112 | -128 | 47 |
| B4R | 0 | 0 | 19 | -128 | 112 | -128 | 112 | -128 | 112 | -128 | 112 | -128 | -128 | 112 | -128 | 77 |
| A4R | 0 | 0 | 0 | -49 | 112 | -128 | 112 | -128 | 112 | -128 | 112 | -128 | 112 | 112 | -128 | 17 |
| A4E | 0 | -63 | 112 | -128 | 112 | -128 | 112 | -128 | 112 | -128 | 112 | -128 | 112 | 112 | -128 | 47 |
| B5R | 0 | 0 | 0 | 74 | 112 | -128 | 112 | -128 | 112 | -128 | 112 | -128 | -128 | 112 | -128 | -106 |
| B5E | 0 | 0 | 0 | 0 | 0 | -128 | 112 | -128 | 112 | -128 | 112 | -128 | 112 | 112 | -128 | -32 |
| A5R | 0 | 0 | 0 | 0 | 112 | -128 | 112 | -128 | 112 | -128 | 112 | -128 | 112 | 112 | -128 | -32 |
| A5E | 0 | 0 | 0 | -49 | 112 | -128 | 112 | -128 | 112 | -128 | 112 | -128 | 112 | 112 | -128 | 17 |
| B6R | 0 | 0 | 0 | 0 | 0 | -31 | 112 | -128 | 112 | -128 | 112 | -128 | 112 | 112 | -128 | -17 |
| A6R | 0 | 0 | 0 | 0 | 0 | 96 | -128 | 112 | 112 | -128 | 112 | -128 | 112 | 112 | -128 | 96 |

IMAGE FORMING METHOD WITH CALIBRATION PROCESSING, AND NON-TRANSITORY COMPUTER-READABLE RECORDING MEDIUM HAVING STORED THEREON IMAGE FORMING PROGRAM OF THE SAME

INCORPORATION BY REFERENCE

This application is based upon, and claims the benefit of priority from, corresponding Japanese Patent Application No. 2019-214486 filed in the Japan Patent Office on Nov. 27, 2019, the entire contents of which are incorporated herein by reference.

BACKGROUND

Field of the Invention

The present disclosure relates to an image forming apparatus, an image forming method, and a non-transitory computer-readable recording medium having stored thereon an image forming program, and more particularly, to calibration processing.

Description of Related Art

Recently, in image forming apparatuses in which an electrophotographic process is used, achieving higher resolution has been pursued, whereby high-definition image output is enabled. In such image forming apparatuses, it has been found that a slight curvature or inclination of a scanning line that runs on a photosensitive drum can affect the image quality.

SUMMARY

The present disclosure provides an image forming apparatus which uses a plurality of color materials to form an image on the basis of input image data assuming an image forming medium, which is one of image forming media of multiple sizes. The image forming apparatus includes a halftone processing portion, a calibration processing portion, an image region dividing portion, and a correction processing portion. The halftone processing portion executes halftone processing on the input image data by using a plurality of dither matrices. The calibration processing portion generates, in order to calculate an amount of color shift that occurs in images formed by the plurality of color materials, common calibration data to be used in common in image formation on the image forming media of multiple sizes, in which the amount of color shift is calculated for each of a plurality of imaginary adjustment regions that are set by dividing, in a main scanning direction, an image formable width, which is a width in the main scanning direction and along which the image formation is enabled, into a plurality of imaginary image adjustment regions corresponding to the imaginary adjustment regions, respectively. The image region dividing portion determines, within the image formable width, a plurality of matrix boundaries corresponding to boundaries between the plurality of dither matrices arranged in an image formation target region, which corresponds to a region in which the image formation is to be performed in the one of image forming media of multiple sizes assumed by the input image data and determines an image boundary position that matches with one of the plurality of matrix boundaries. The image region dividing portion also divides the image formation target region at each of the determined image boundary positions in the main scanning direction, thereby setting a plurality of image adjustment regions. The correction processing portion uses the common calibration data to determine the plurality of imaginary adjustment regions positioned closest to the plurality of image adjustment regions, respectively, according to positions of the plurality of image adjustment regions in the main scanning direction within the image formable width, and uses a correction amount for each of the determined imaginary adjustment regions to correct the position of the image adjustment region in a sub-scanning direction for each of the plurality of image adjustment regions, thereby reducing the color shift. The image region dividing portion determines the image boundary position by applying a rounding function to a value obtained by dividing the number of pixels constituting a width of the image adjustment region by the number of pixels in one cycle of the dither matrix in the main scanning direction.

The present disclosure provides an image forming method which uses a plurality of color materials to form an image on the basis of input image data assuming an image forming medium, which is one of image forming media of multiple sizes. The image forming method includes executing halftone processing, performing calibration processing of generating, performing image region dividing, and performing correction processing. The halftone processing is executed on the input image data by using a plurality of dither matrices. The calibration processing is performed as generating, in order to calculate an amount of color shift that occurs in images formed by the plurality of color materials, common calibration data to be used in common in image formation on the image forming media of multiple sizes, in which the amount of color shift is calculated for each of a plurality of imaginary adjustment regions that are set by dividing, in a main scanning direction, an image formable width, which is a width in the main scanning direction and along which the image formation is enabled, into a plurality of imaginary image adjustment regions corresponding to the imaginary adjustment regions, respectively. The image region dividing is performed as image region dividing of determining, within the image formable width, a plurality of matrix boundaries corresponding to boundaries between the plurality of dither matrices arranged in an image formation target region, which corresponds to a region in which the image formation is to be performed in the one of image forming media of multiple sizes assumed by the input image data and determining an image boundary position that matches with one of the plurality of matrix boundaries. The image region dividing is also performed as dividing the image formation target region at each of the determined image boundary positions in the main scanning direction, thereby setting a plurality of image adjustment regions. The correction processing is performed as using the common calibration data to determine the plurality of imaginary adjustment regions positioned closest to the plurality of image adjustment regions, respectively, according to positions of the plurality of image adjustment regions in the main scanning direction within the image formable width, and using a correction amount for each of the determined imaginary adjustment regions to correct the position of the image adjustment region in a sub-scanning direction for each of the plurality of image adjustment regions, thereby reducing the color shift. The image region dividing determines the image boundary position by applying a rounding function to a value obtained by dividing the number of pixels constituting a width of the image adjustment region by the number of pixels in one cycle of the dither matrix in the main scanning direction.

The present disclosure provides a non-transitory computer-readable recording medium having stored thereon an image forming program for controlling an image forming apparatus which uses a plurality of color materials to form an image based on input image data assuming an image forming medium, which is one of image forming media of multiple sizes. The image forming program causes the image forming apparatus to function as a halftone processing portion, a calibration processing portion, an image region dividing portion, and a correction processing portion. The halftone processing portion executes halftone processing on the input image data by using a plurality of dither matrices. The calibration processing portion generates, in order to calculate an amount of color shift that occurs in images formed by the plurality of color materials, common calibration data to be used in common in image formation on the image forming media of multiple sizes, in which the amount of color shift is calculated for each of a plurality of imaginary adjustment regions that are set by dividing, in a main scanning direction, an image formable width, which is a width in the main scanning direction and along which the image formation is enabled, into a plurality of imaginary image adjustment regions corresponding to the imaginary adjustment regions, respectively. The image region dividing portion determines, within the image formable width, a plurality of matrix boundaries corresponding to boundaries between the plurality of dither matrices arranged in an image formation target region, which corresponds to a region in which the image formation is to be performed in the one of image forming media of multiple sizes assumed by the input image data and determines an image boundary position that matches with one of the plurality of matrix boundaries. The image region dividing portion also divides the image formation target region at each of the determined image boundary positions in the main scanning direction, thereby setting a plurality of image adjustment regions. The correction processing portion uses the common calibration data to determine the plurality of imaginary adjustment regions positioned closest to the plurality of image adjustment regions, respectively, according to positions of the plurality of image adjustment regions in the main scanning direction within the image formable width, and uses a correction amount for each of the determined imaginary adjustment regions to correct the position of the image adjustment region in a sub-scanning direction for each of the plurality of image adjustment regions, thereby reducing the color shift. The image region dividing portion determines the image boundary position by applying a rounding function to a value obtained by dividing the number of pixels constituting a width of the image adjustment region by the number of pixels in one cycle of the dither matrix in the main scanning direction.

BRIEF DESCRIPTION OF THE DRAWINGS

FIG. 8 is a flowchart showing details of image region mapping processing according to one embodiment;

FIGS. 10A, 10B and 10C are explanatory diagrams showing each of calculation formulas for use in boundary position adjustment processing according to one embodiment;

FIG. 11 is a diagram including tables each showing results of boundary position adjustment processing according to a comparative example;

FIG. 12 is a diagram including tables showing adjustment amounts of the boundary position adjustment processing according to the comparative example and the embodiment;

FIG. 13 is a diagram including tables each showing results of the boundary position adjustment processing according to the embodiment;

FIG. 14 is a table showing the amounts of adjustment reduction by the boundary position adjustment processing according to the embodiment; and FIG. 15 is a diagram including tables showing the amount of change in a width of each image adjustment region according to the comparative example and the embodiment.

DETAILED DESCRIPTION

Embodiments of the present disclosure will be described below with reference to the accompanying drawings.

Figure 1:
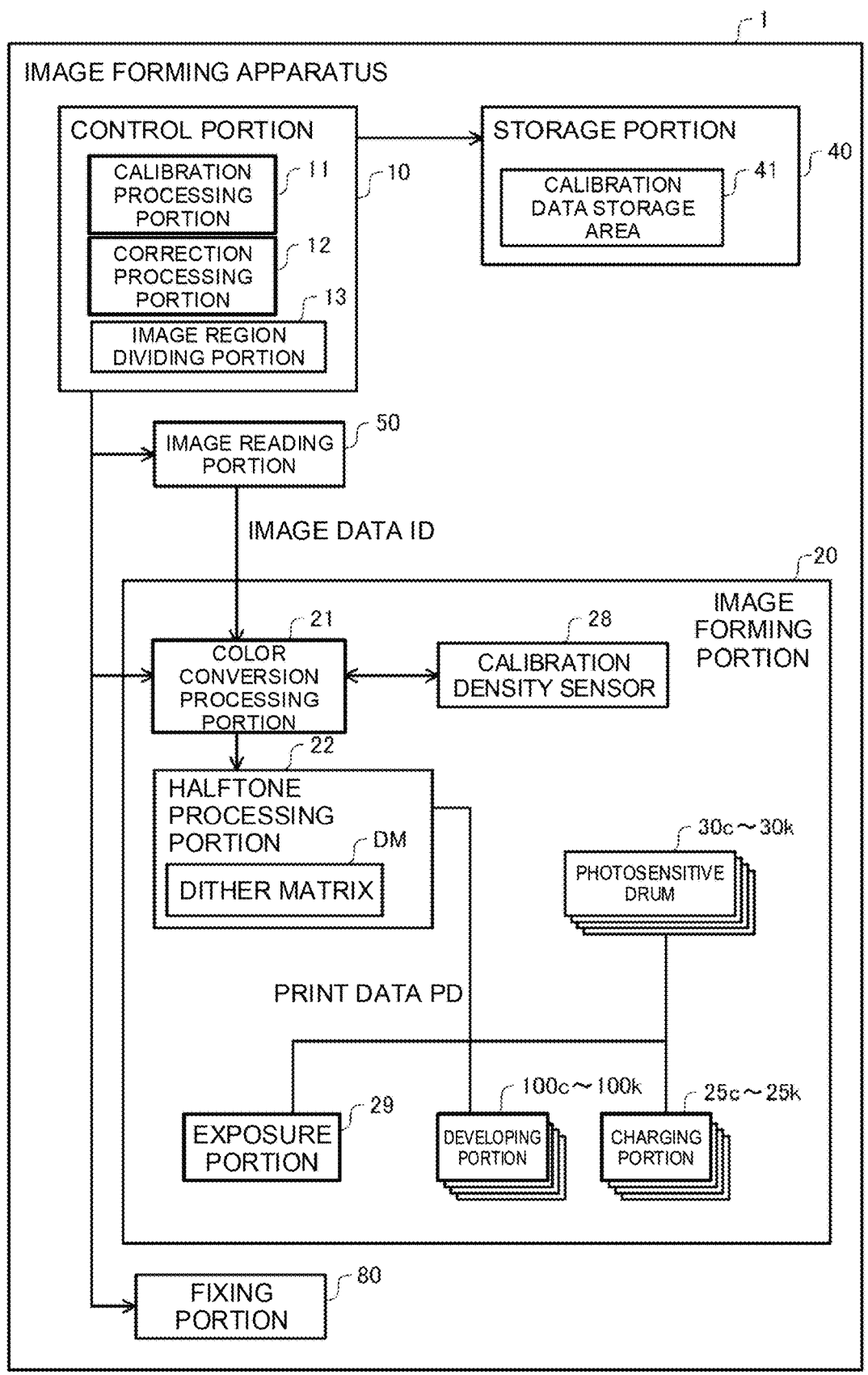
FIG. 1 is a block diagram showing a functional configuration of an image forming apparatus 1 according to one embodiment of the present disclosure.

FIG. 1 is a block diagram showing a functional configuration of an image forming apparatus 1 according to one embodiment of the present disclosure. The image forming apparatus 1 includes a control portion 10, an image forming portion 20, a storage portion 40, an image reading portion 50, and a fixing portion 80. The image reading portion 50 reads an image from a document, and generates image data ID corresponding to RGB digital data.

The image forming portion 20 includes: a color conversion processing portion 21; a halftone processing portion 22; a calibration density sensor 28; an exposure portion 29; photosensitive drums (image carriers) 30c to 30k, which are amorphous silicon photoreceptors; developing portions 100c to 100k; and charging portions 25c to 25k. The image forming portion 20 forms an image on an image forming medium on the basis of input image data by using a plurality of color materials (such as CMYK toners or inks). In the image forming portion 20, the color conversion processing portion 21 performs color conversion to change the image data ID corresponding to RGB data to CMYK data.

The halftone processing portion 22 includes a dither matrix DM. The halftone processing portion 22 executes halftone processing on the CMYK data by using the dither matrix DM, and generates print data PD including CMYK halftone data. The halftone data represents the state of formation of dots that are formed by each of the CMYK toners, and may also be referred to as dot data.

The control portion 10 is provided with main storage means such as a RAM and a ROM, and control means such as a micro processing unit (MPU) or a central processing unit (CPU). Also, the control portion 10 has a controller function related to various I/O devices, a universal serial bus (USB), a bus, and an interface of other hardware devices, and controls the image forming apparatus 1 as a whole. The control portion 10 is provided with a calibration processing portion 11, a correction processing portion 12, and an image region dividing portion 13. The functions of the calibration processing portion 11, the correction processing portion 12, and the image region dividing portion 13 will be described later.

The storage portion 40 is a storage device constituted of a hard disk drive, a flash memory, or the like, which are non-transitory recording media, and stores a control program and data for the processing executed by the control portion 10. In the present embodiment, the storage portion 40 further includes a calibration data storage area 41.

Figure 2:
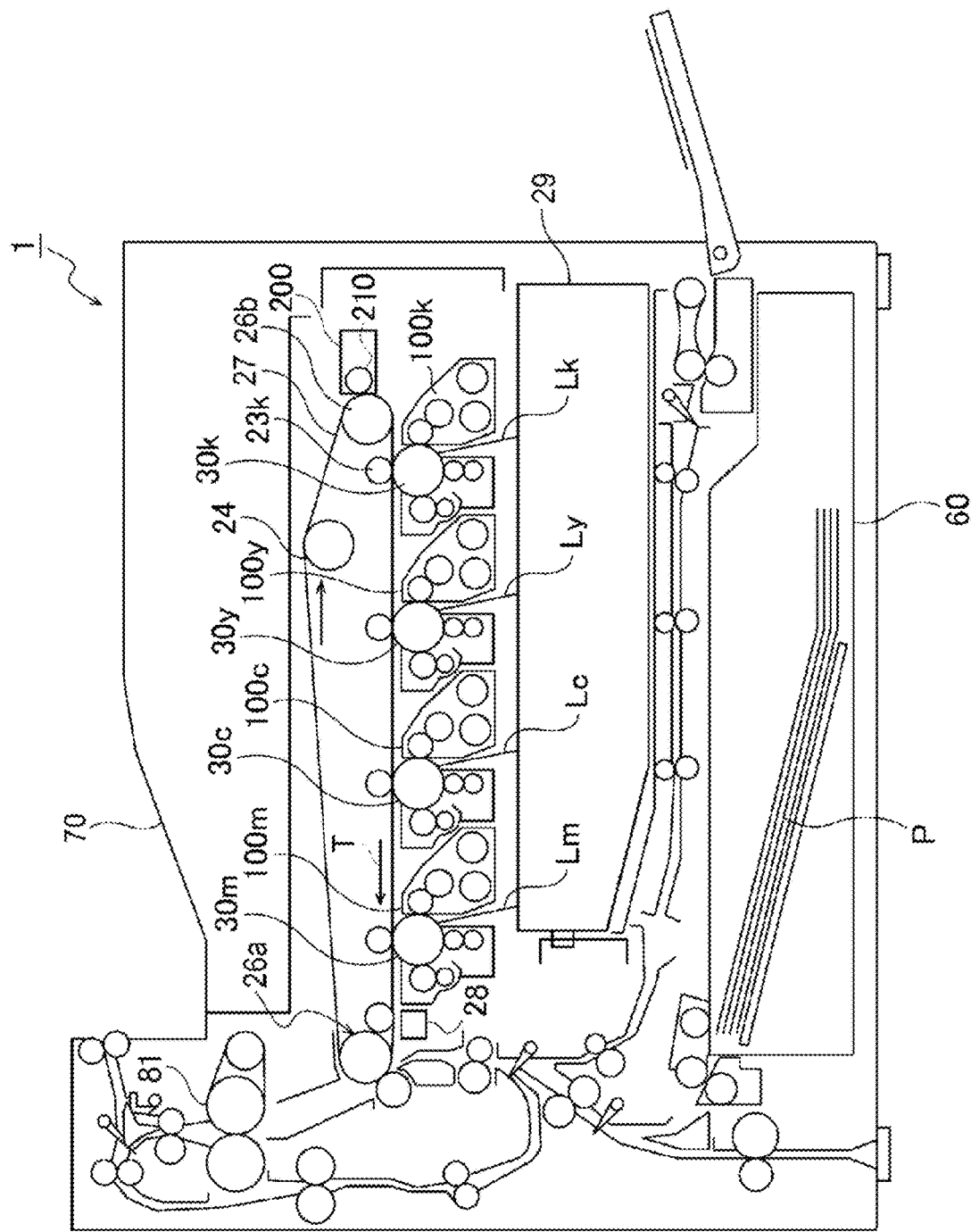
FIG. 2 is a cross-sectional view showing the overall configuration of the image forming apparatus 1 according to one embodiment.

FIG. 2 is a cross-sectional view showing the overall configuration of the image forming apparatus 1 according to one embodiment. The image forming apparatus 1 of the present embodiment is a tandem color printer. In the image forming apparatus 1, the photosensitive drums (image carriers) 30m, 30c, 30y, and 30k are arranged in a row to correspond to the respective colors of magenta, cyan, yellow and black inside a housing 70 of the image forming apparatus 1. The developing portions 100m, 100c, 100y, and 100k are arranged adjacent to the photosensitive drums 30m, 30c, 30y and 30k, respectively.

The photosensitive drums 30m, 30c, 30y and 30k are irradiated (subjected to exposure) with laser beams Lm, Lc, Ly and Lk for the respective colors from the exposure portion 29. As a result of the irradiation, electrostatic latent images are formed on the photosensitive drums 30m, 30c, 30y and 30k. The developing portions 100m, 100c, 100y and 100k cause the toners to be adhered to the electrostatic latent images formed on the surfaces of the photosensitive drums 30m, 30c, 30y and 30k, while stirring the toners. By the above processing, a developing step is completed, and toner images of the respective colors are formed on the surfaces of the photosensitive drums 30c to 30k.

The image forming apparatus 1 includes an endless intermediate transfer belt 27. The intermediate transfer belt 27 is stretched across a tension roller 24, a driving roller 26a, and a driven roller 26b. The intermediate transfer belt 27 is driven to circulate by the rotation of the driving roller 26a.

At an upstream position of the photosensitive drum 30k, a cleaning device 200 is arranged at a position opposed to the driven roller 26b with the intermediate transfer belt 27 sandwiched therebetween. The cleaning device 200 includes a fur brush 210 which is planted with fine fibers, and rotates at high speed. The fur brush 210 can mechanically remove the toner on the intermediate transfer belt 27 by a scraping force at the tip of the brush. In this way, the image forming apparatus 1 employs a brush cleaning method using the fur brush 210 which comes into contact with the intermediate transfer belt 27 to scrape off and discard the used toner.

For example, a black toner image on the photosensitive drum 30k is primarily transferred to the intermediate transfer belt 27 as the intermediate transfer belt 27 is sandwiched between the photosensitive drum 30k and a primary transfer roller 23k, and the intermediate transfer belt 27 is driven to circulate. The above similarly applies to the other three colors, i.e., cyan, yellow, and magenta.

A full-color toner image is formed on the surface of the intermediate transfer belt 27 as primary transfers of the respective toner images are performed such that the transferred toner images are superimposed on one another at specific timings. The calibration density sensor 28 is arranged at a position where the density of the toner image, which is the image obtained when the primary transfer is complete but a secondary transfer is yet to be performed, can be measured.

The full-color toner image is then secondarily transferred to a print sheet P which is supplied from a paper feed cassette 60, and fixed onto the print sheet P by a pair of fixing rollers 81 of the fixing portion 80. The cleaning device 200 can remove residual toner remaining on the intermediate transfer belt 27 from the intermediate transfer belt 27 similarly for a calibration patch. A print medium may also be referred to as an image forming medium.

In the present embodiment, it is assumed that each of scanning lines, which are formed by the laser beams Lm, Lc, Ly, and Lk for the respective colors to be applied to (for exposure on) the photosensitive drums 30m, 30c, 30y, and 30k, is inclined relative to a rotation axis of each of the photosensitive drums 30m, 30c, 30y, and 30k within a range of a manufacturing tolerance. If such inclinations are not corrected, the inclinations are materialized as an inclination of an image with respect to the print medium. Although such an inclination of the image is so small that a human cannot detect it visually, the inclination causes a color shift that occurs as a result of positional deviation of toner dots of the respective colors. In the present embodiment, the color shift is reduced by image processing as will be described later.

Figure 3:
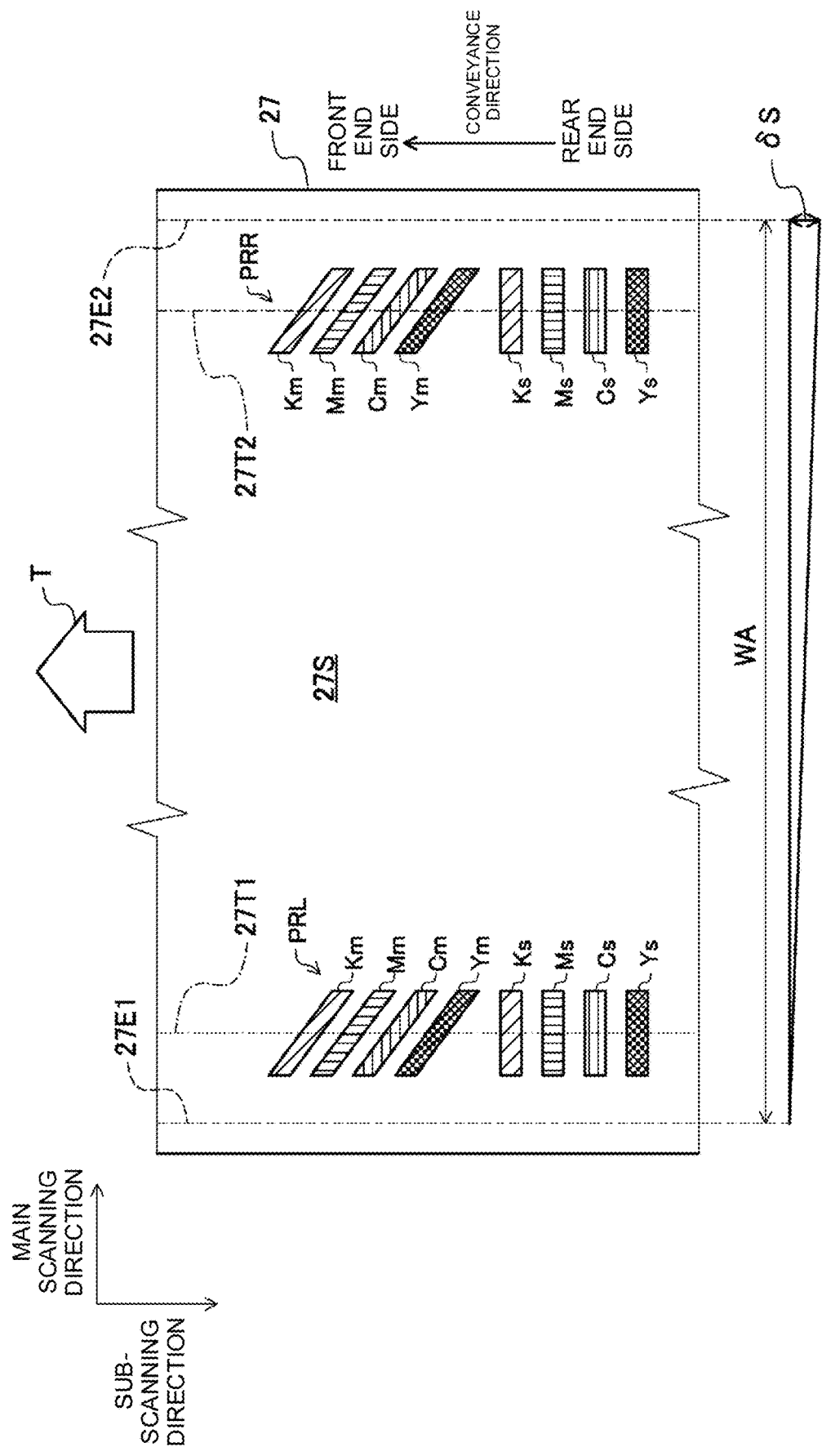
FIG. 3 shows registration adjustment charts on a transfer surface 27S of an intermediate transfer belt 27 according to one embodiment.

FIG. 3 shows registration adjustment charts on a transfer surface 27S of the intermediate transfer belt 27 according to one embodiment. A belt coating layer (not shown) is formed on the transfer surface 27S. The image forming apparatus 1 is configured such that the print medium comes into contact with the transfer surface 27S within an image formable width WA between a first boundary 27E1 and a second boundary 27E2, so as to enable image formation. While the print medium is conveyed in a direction of a driving direction T (also referred to as a conveyance direction) in a state of being in contact with the transfer surface 27S, the secondary transfer is performed.

A pair of registration adjustment charts PRL and PRR is formed on the transfer surface 27S. The registration adjustment chart PRL on the left side is arranged such that the registration adjustment chart PRL is aligned in the driving direction T to have a center line 27T1 in the vicinity of the first boundary 27E1, which is an end portion located in a direction perpendicular to the driving direction T. The registration adjustment chart PRR on the right side is arranged such that the registration adjustment chart PRR is aligned in the driving direction T to have a center line 27T2 in the vicinity of the second boundary 27E2, which is an end portion located in a direction perpendicular to the driving direction T.

Each chart of the pair of registration adjustment charts PRL and PRR is used in registration adjustment processing, and the concentration is measured by the calibration density sensor 28. In the registration adjustment processing, the calibration processing portion 11 adjusts the timing to form each of the toner images so that the photosensitive drums 30m, 30c, 30y and 30k can form a full-color toner image by having the toner images superimposed on one another accurately (see FIG. 2).

The registration adjustment chart PRL on the left side is formed by each of the CMYK toners at specific timings. The registration adjustment chart PRL includes each of a K main patch Km, an M main patch Mm, a C main patch Cm and a Y main patch Ym, and also a K sub-patch Ks, an M sub-patch Ms, a C sub-patch Cs, and a Y sub-patch Ys. Each patch has the same unit length in the belt conveyance direction. The registration adjustment chart PRR on the right side is the same as the registration adjustment chart PRL on the left side, except that the position of the center line is shifted from the center line 27T1 to the center line 27T2.

The K main patch Km, the M main patch Mm, the C main patch Cm, and the Y main patch Ym are patches for detecting the amount of color shift between a plurality of images in a main scanning direction (i.e., a direction perpendicular to the conveyance direction). The K sub-patch Ks, the M sub-patch Ms, the C sub-patch Cs, and the Y sub-patch Ys are patches for detecting the amount of color shift between a plurality of images in a sub-scanning direction (i.e., a direction parallel to the conveyance direction).

Figure 4:
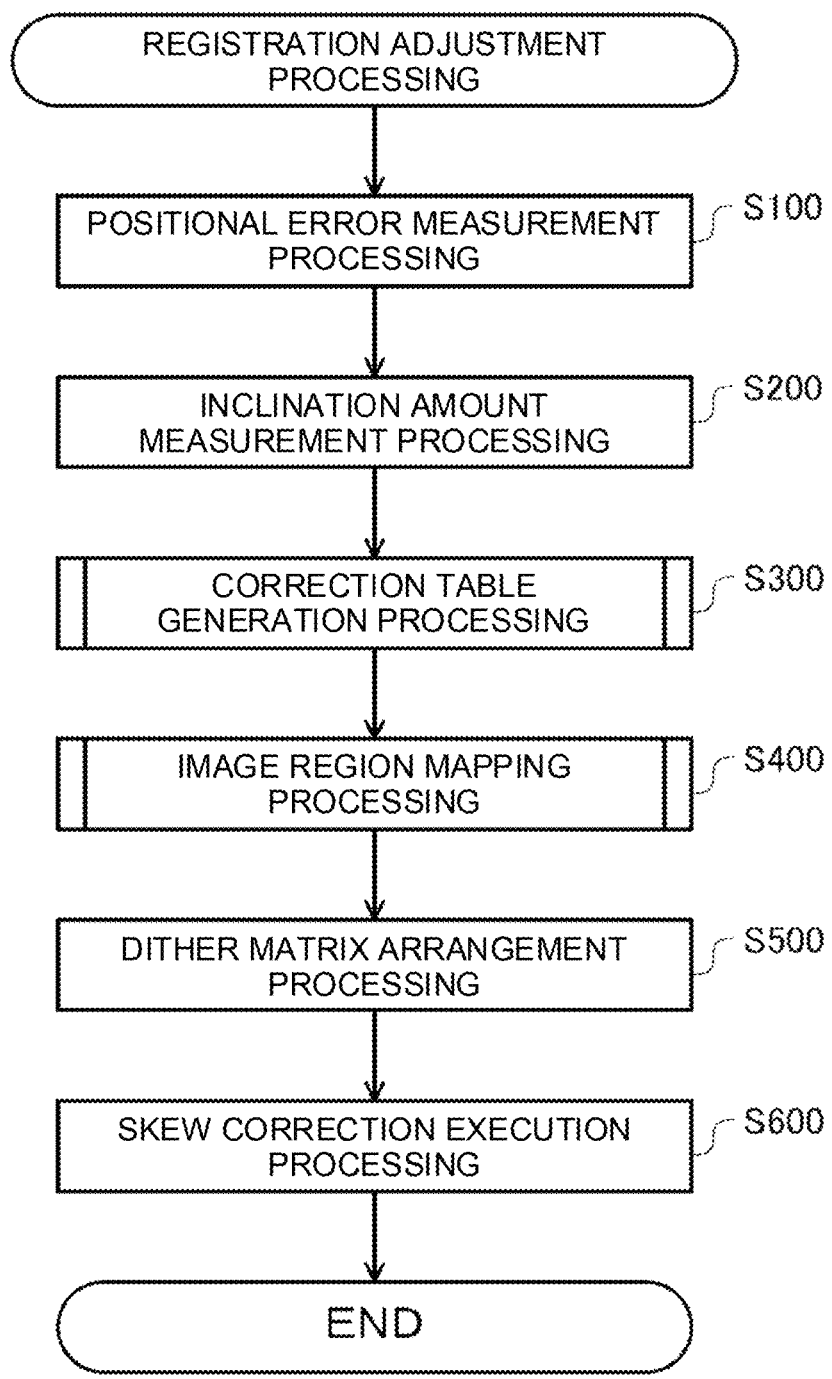
FIG. 4 is a flowchart showing details of registration adjustment processing according to one embodiment.

FIG. 4 is a flowchart showing details of the registration adjustment processing according to one embodiment. The registration adjustment processing according to one embodiment includes adjustment for reducing a shift between image formation start timings for the respective colors in the main scanning direction and the sub-scanning direction, and a misalignment of the images of the respective colors caused by inclinations of the scanning lines.

In step S100, the calibration processing portion 11 executes positional error measurement processing. In the positional error measurement processing, the calibration processing portion 11 measures a positional deviation for CMYK in each of the main scanning direction and the sub-scanning direction by using the pair of registration adjustment charts PRL and PRR. The positional deviation for CMYK is measured as an average of the positional deviations that have been measured by using the pair of registration adjustment charts PRL and PRR.

The positional deviation (color shift amount) in the main scanning direction is obtained with reference to the K main patch Km among the C main patch Cm, the M main patch Mm, the Y main patch Ym, and the K main patch Km that are formed by each of the CMYK toners. That is, the aforementioned positional deviation is measured as relative positional deviations of the C main patch Cm, the M main patch Mm, and the Y main patch Ym with respect to the position of the K main patch Km in the main scanning direction. The positional deviation (color shift amount) in the sub-scanning direction is obtained with reference to the K sub-patch Ks among the C sub-patch Cs, the M sub-patch Ms, the Y sub-patch Ys, and the K sub-patch Ks. That is, the aforementioned positional deviation is measured as relative positional deviations of the C sub-patch Cs, the M sub-patch Ms, and the Y sub-patch Ys with respect to the position of the K sub-patch Ks in the sub-scanning direction.

In step S200, the calibration processing portion 11 executes inclination amount measurement processing (also referred to as skew amount measurement processing). In the inclination amount measurement processing, the calibration processing portion 11 measures the amount of inclination as a difference between sub-scanning positions obtained by using the pair of registration adjustment charts PRL and PRR.

Specifically, the calibration processing portion 11 uses the registration adjustment chart PRL on the left side to measure the relative position of each of the patches Cs, Ms, and Ys in the sub-scanning direction with respect to the K sub-patch Ks on the left side, and uses the registration adjustment chart PRR on the right side to measure the relative position of each of the patches Cs, Ms, and Ys in the sub-scanning direction with respect to the K sub-patch Ks on the right side. That is, the calibration processing portion 11 measures the inclination of the main scanning line of each of the laser beams Lm, Lc, and Ly with respect to the main scanning line of the laser beam Lk.

The calibration processing portion 11 can calculate the amount of deviation 6S as the maximum difference in the image formable width WA by measuring, for each of the colors of CMY, a difference between the right and left sub-scanning positions in units of pixels with reference to the sub-scanning position of the color corresponding to K, multiplying the measured value by a distance between the first boundary 27E1 and the second boundary 27E2, and dividing the obtained value by a distance between the center line 27T1 and the center line 27T2.

Specifically, the calibration processing portion 11 calculates the amount of deviation as a diagonally downward inclination to the right by five pixels in a case where the position of the cyan (C) scanning line in the sub-scanning direction on the left side is advanced by two pixels in the sub-scanning direction (with reference to the conveyance direction T) relative to the position of the K scanning line in the sub-scanning direction on the left side, in terms of the position of the first boundary 27E1 (left side), and is behind by three pixels in the sub-scanning direction (with reference to the conveyance direction T) relative to the position of the K scanning line in the sub-scanning direction on the right side, in terms of the position of the second boundary 27E2 (right side) (see the amount of deviation 6S). That is, the calibration processing portion 11 measures the inclination of each of the CMY scanning lines with reference to the direction of the K scanning line, not with reference to the direction of the rotation axis of each of the photosensitive drums $30m$, $30c$, $30y$ and $30k$.

Figure 5:
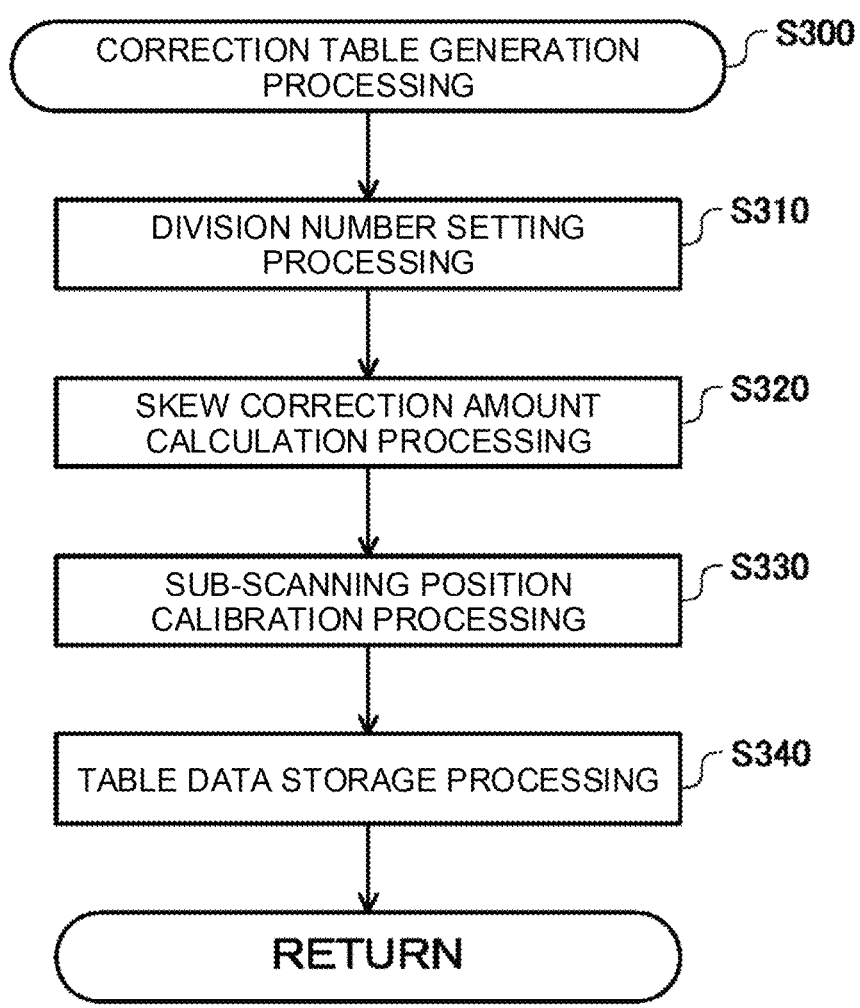
FIG. 5 is a flowchart showing details of image region correction table generation processing according to one embodiment.
Figure 6A:
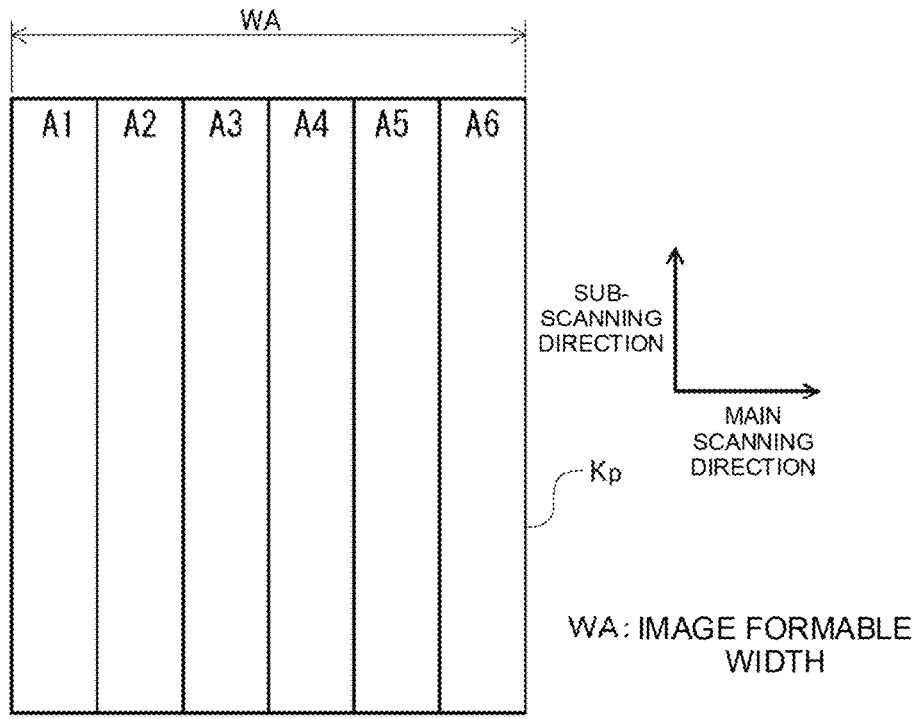
FIGS. 6A and 6B are explanatory diagrams showing details of image region division processing and the registration adjustment processing according to one embodiment.
Figure 6B:
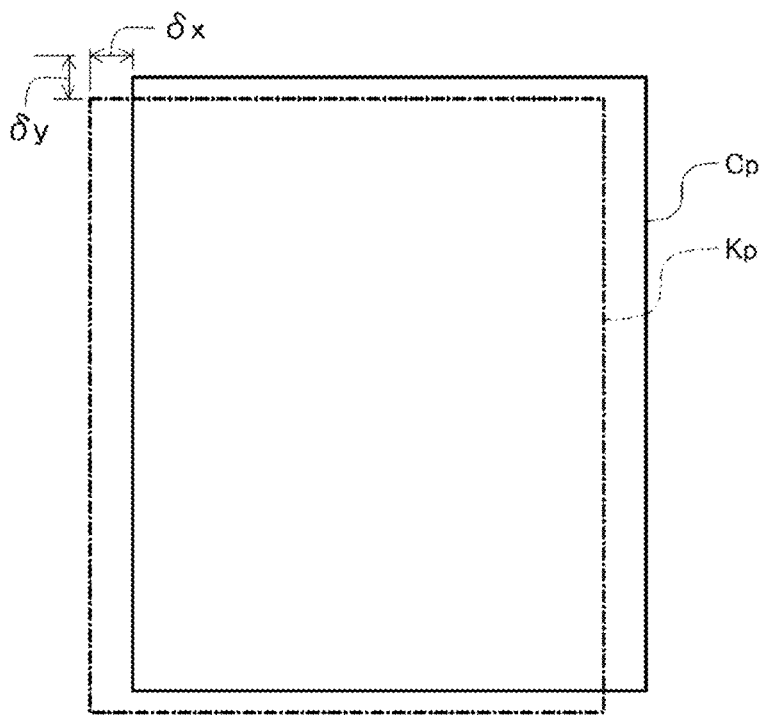

FIG. 5 is a flowchart showing details of image region correction table generation processing (step S300) according to one embodiment. FIGS. 6A and 6B are explanatory diagrams showing details of image region division processing and the registration adjustment processing according to one embodiment. FIGS. 7A to 7D are explanatory diagrams showing details of skew correction amount calculation processing according to one embodiment. In the image region correction table generation processing, the calibration processing portion 11 generates a common image region correction table that is applicable to images to be formed on print sheets of various sizes, with reference to the image formable width WA.

In the present embodiment, the inclination of each scanning line is defined as the amount of deviation 6S in the sub-scanning direction in the image formable width WA between the first boundary 27E1 and the second boundary 27E2. In the present example, in order to make the explanation easy to understand, it is assumed that only the inclinations of the scanning lines occur, and no curvature of the scanning lines occur.

In step S310, the image region dividing portion 13 executes division number setting processing. In the division number setting processing, the image region dividing portion 13 sets the number of divisions in the main scanning direction on the basis of the amount of deviation 6S (see FIG. 7B). Specifically, the image region dividing portion 13 sets a greater number of divisions as the amount of deviation 6S is increased, and sets a fewer number of divisions as the amount of deviation 6S is reduced. In the present example, in order to make the explanation easy to understand, it is assumed that the amount of deviation 6S is equivalent to five pixels, and the image region dividing portion 13 has set the number of divisions to 6 (derived from five (5) pixels+1) (see FIGS. 7A to 7C).

In the present example, the image formable width WA is divided into six areas (also referred to as image adjustment regions), which are a first area A1 to a sixth area A6. The six areas consisting of the first area A1 to the sixth area A6 are partitioned at a first image boundary position BL1 to a fifth image boundary position BL5.

In step S320, the calibration processing portion 11 executes the skew correction amount calculation processing with reference to the color K for each of the colors of CMY. In the skew correction amount calculation processing, the correction processing portion 12 uses the amount of deviation 6S to calculate, with reference to a reference area (the third area A3 in the present example), the correction amount for each of the image adjustment regions according to a distance from a reference region in the main scanning direction. That is, the correction processing portion 12 calculates, on the basis of a similarity relation, the correction amount for each of the five areas, which are areas A1, A2, and A4 to A6 other than the reference area (the third area A3 in the present example), among the six areas constituted of the first area A1 to the sixth area A6, by using a distance from the reference area to each of the above five areas in the main scanning direction and the amount of deviation 6S (FIG. 7D).

In the present example, area A1 of color C includes a correction amount of −2 pixels relative to the reference area (third area A3) as calibration data (attribute information) (see FIG. 7D), and area A6 of color C includes a correction amount of +3 pixels relative to the reference area as the calibration data. Areas A2, A4, and A5 of color C include correction amounts of −1 pixel, +1 pixel, and +2 pixels, respectively, as the calibration data.

Figure 7A:
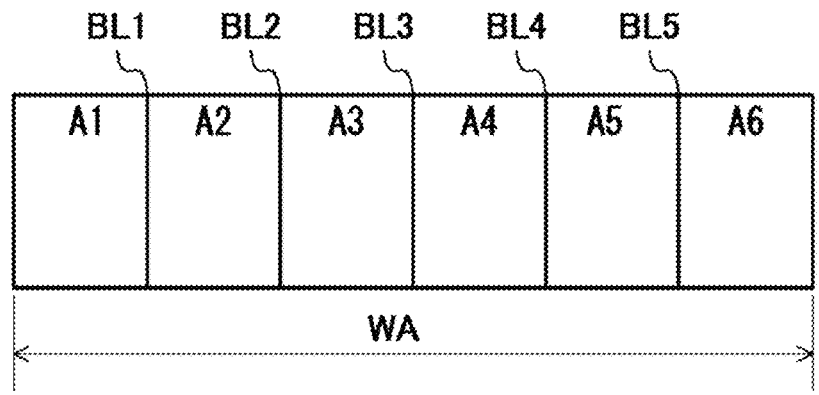
FIGS. 7A, 7B, 7C and 7D are explanatory diagrams showing details of skew correction amount calculation processing according to one embodiment.
Figure 7B:
Figure 7C:
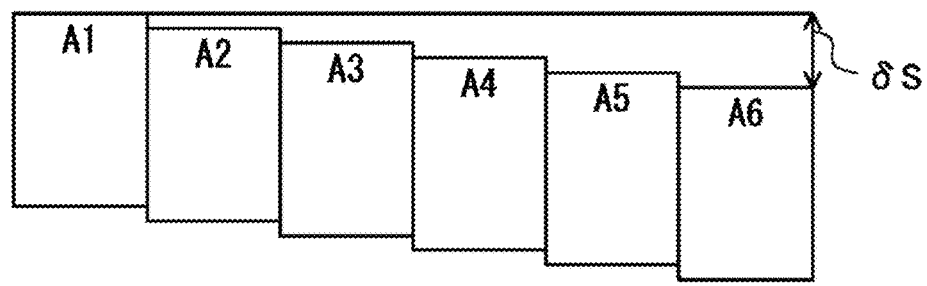
Figure 7D:
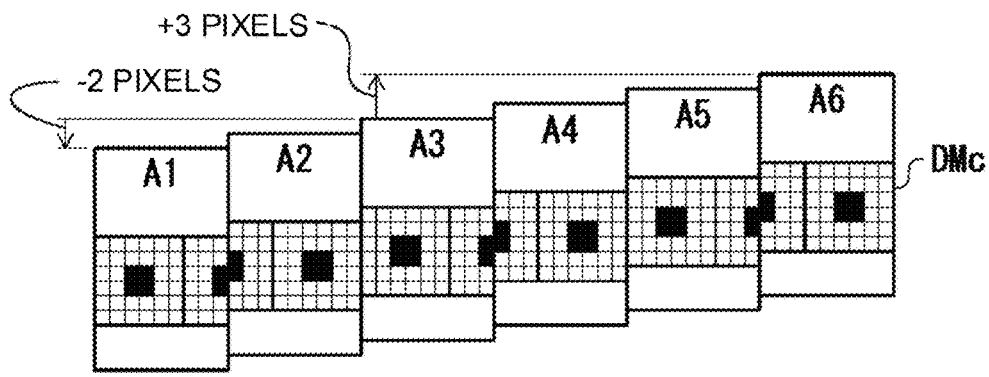

Moreover, FIG. 7D shows an example of the arrangement of dither matrices DMc in the six areas (FIG. 6A) constituted of the first area A1 to the sixth area A6. As can be seen from the example of the arrangement in FIG. 7D, in the dither matrices DMc, the dithers are disordered in the midstream as a result of the six areas, which are the first area A1 to the sixth area A6, having been moved in the sub-scanning direction.

In step S330, the correction processing portion 12 executes sub-scanning position calibration processing. In the sub-scanning position calibration processing, the correction processing portion 12 assumes the third area A3, which is the area (also referred to as the image adjustment region) corresponding to a central position of the image formable width WA, among the six areas, i.e., the first area A1 to the sixth area A6, as the reference area (also referred to as the reference region), and calculates a main scanning position adjustment amount ox, which is the amount of adjustment for the main scanning position on the overall plane Cp corresponding to C with respect to plane Kp corresponding to K, and a sub-scanning position adjustment amount δγ, which is the amount of adjustment for the sub-scanning position of the same (FIG. 6B). In order to make the explanation easy to understand, FIG. 6B shows the state in which no skew of a recognizable degree has occurred.

The reason why the area corresponding to the central position of the image formable width WA, or more specifically, the center of the image in the main scanning direction is selected is that the greater the distance in the main scanning direction is, the greater the deviation in the sub-scanning direction that is caused by an inclination (skew) of the main scanning line becomes. That is, the correction processing portion 12 selects the central position of the image formable width WA as the reference in order to reduce a distance from a reference position of the image in the main scanning direction by equalizing the distance on both sides. By doing so, the correction processing portion 12 reduces the amount of color shift in the sub-scanning direction overall.

In step S340, the calibration processing portion 11 executes table data storage processing. In the table data storage processing, the calibration processing portion 11 stores, as the calibration data, each of the correction amounts for areas A1 to A6, the main scanning position adjustment amount δx, and the sub-scanning position adjustment amount δγ in the calibration data storage area 41 of the storage portion 40. The calibration data is used in common in forming images on print sheets of multiple sizes. Therefore, the calibration data may also be referred to as common calibration data.

By the above feature, the image forming apparatus 1 can make correction by a varied amount in the sub-scanning direction for each image adjustment region, and can reduce the positional deviation caused by the inclinations of the respective scanning lines. As a result, it is possible to reduce deterioration of the image quality due to the inclination of each of the scanning lines formed by the laser beams Lm, Lc, Ly and Lk.

Figure 9:
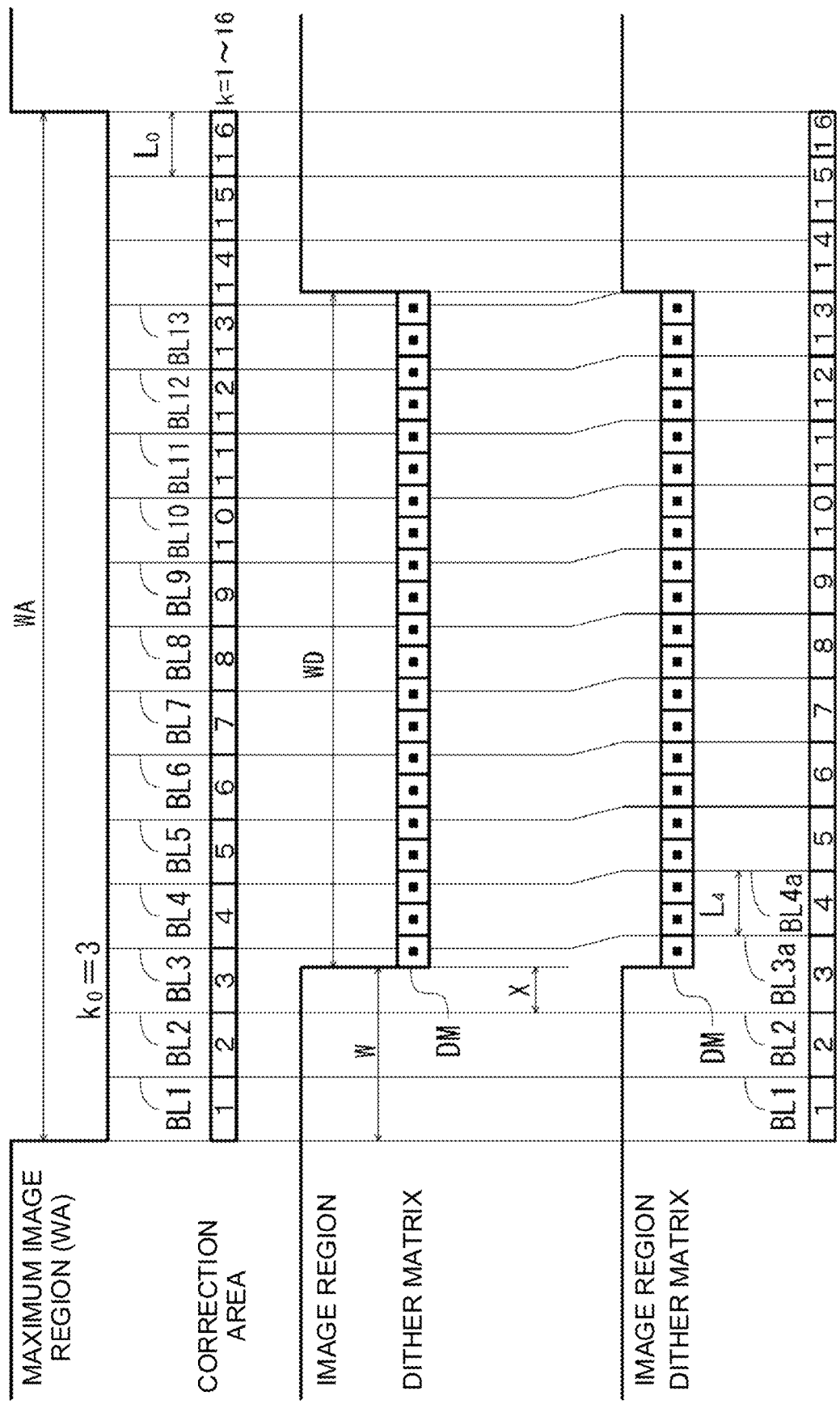
FIG. 9 is an explanatory diagram showing details of the image region mapping processing according to one embodiment.

FIG. 8 is a flowchart showing details of image region mapping processing (step S400) according to one embodiment. FIG. 9 is an explanatory diagram showing details of the image region mapping processing according to one embodiment. FIGS. 10A, 10B and 10C are explanatory diagrams showing each of calculation formulas for use in boundary position adjustment processing according to one embodiment. In the present example, in order to make the explanation easy to understand, the dither matrix DM that is relatively smaller than the dither matrix DMc (FIG. 7D) is arranged. The dither matrix DM is a quadrate matrix of 5 elements by 5 elements (i.e., a matrix in which M=5). The image formable width WA is equivalent to a width of 160 pixels.

FIG. 9 shows first area A1 to sixteenth area A16. The first area A1 to the sixteenth area A16 are indicated by the numbers 1 to 16 in a correction area. In the present example, in order to make the explanation easy to understand, the image formable width WA is equally divided into 16 parts, i.e., 16 areas (also referred to as the image adjustment regions). Each of the areas, i.e., the first area A1 to the sixteenth area A16, has a width in pixels of 10 pixels (number of pixels $L_0$=10). A first image boundary position BL1 partitions the first area A1 and the second area A2. The second to fifteenth image boundary positions BL2 to BL15 similarly partition the other areas.

In step S410, the image region dividing portion 13 executes start-edge side boundary determination processing. Calculation formula F1 is a calculation formula for determining a start-edge side boundary, which is the boundary on which the boundary position adjustment processing is to be performed, and corresponds to the leftmost boundary, in the image formable width WA (FIG. 10A). The start-edge side boundary is determined on the basis of a start position of a target (i.e., a start edge of an image formation target region WD in the main scanning direction) of processing of the dither matrix DM. In the present example, the start edge is set at a position with a margin width W of 27 pixels being interposed from a start edge of the image formable width WA (FIG. 9).

In calculation formula F1, Int (W/$L_0$) is a function that returns the integer part of a value obtained by dividing W by $L_0$. According to calculation formula F1, since $K_0$=3 (derived from Int (27/10)+1), the third image boundary position BL3 is determined as the start-edge side boundary. According to calculation formula F2 (FIG. 10B), when k<$k_0$, that is, at a part outside (i.e. on the left side of) the start-edge side boundary, the width in pixels L of the image adjustment region is equal to $L_0$ (L=$L_0$). Here, the number of pixels $L_0$ refers to a width in pixels of the image adjustment region for which the boundary position adjustment is not performed.

In step S420, the image region dividing portion 13 executes start-edge side boundary position adjustment processing. In the start-edge side boundary position adjustment processing, the image region dividing portion 13 calculates the amount of adjustment for the start-edge side boundary position by using calculation formulas F2 and F3. Calculation formula F3 is a calculation formula for calculating the width of the third area A3 including the start-edge side boundary position (FIG. 10B). In the present example, calculation formula F3 calculates a third image boundary position BL3a. A rear end of the dither matrix DM (also referred to as a matrix boundary) matches the third image boundary position BL3a.

According to calculation formula F3, when k=$k_0$ (where $k_0$=3), $L_k$ is represented as $L_k$=x+Round (($L_0$−x)/m)×m. In the above, x=W mod $L_0$, in other words, x=7. Here, x represents a boundary adjustment distance to the nearest temporary image shift position in the left direction. Accordingly, since $L_k$ is calculated as 7+Round ((10−7)/5)×5, which is equal to 7+Round (0.6)×5, $L_k$=12 is output. That is, according to calculation formula F3, the width in pixels, $L_3$, of the third area A3, which is the image adjustment region including the start-edge side boundary position, is equivalent to 12 pixels.

In step S430, the image region dividing portion 13 executes central region boundary position adjustment processing. In the central region boundary position adjustment processing, the image region dividing portion 13 adjusts respective central region boundary positions BL4 to BL13 between the start-edge side boundary position BL3 and an end-edge side boundary position BL14 by using calculation formula F4. Calculation formula F4 is a calculation formula for calculating the width of a k-th area in order to determine a k-th image boundary position $BL_k$, which is the k-th image boundary position (FIG. 10C). In all cases of the k-th image boundary position $BL_k$, the starting end or rear end of the matrix boundary matches with the image boundary position.

According to calculation formula F4, when k>$k_0$, considering the case of k=4, for example, the numerator in the ROUND function of calculation formula F4 is (k−$k_0$+1)× $L_0$−(the sum of the $K_0$-th to the (K−1)-th widths), or more specifically, (4−3+1)×$L_0$−$L_3$. That is, 12 pixels ($L_k$=12), which is the length of the image adjustment region for $L_3$ already determined, is subtracted from the length (=10× 2=20 pixels) corresponding to two sections of the width in pixels, $L_0$ of the image adjustment region. Accordingly, the numerator in the ROUND function of calculation formula F4 is 8, and Round (8/5=1.6) is equal to 2. Therefore, $L_4$=2×5 is obtained, which means that $L_4$ is equal to 10 pixels. The ROUND function is also referred to as the rounding function.

In step S440, the correction processing portion 12 executes skew correction amount determination processing. In the skew correction amount determination processing, the correction processing portion 12 extracts each area (image adjustment region), which is for use in forming an image, of the image formation target region WD from the first area A1 to the sixteenth area A16.

In the present example, the correction processing portion 12 extracts the third area A3 to the thirteenth area A13. The correction processing portion 12 reads and acquires each of the correction amounts for the third area A3 to the thirteenth area A13 from the calibration data storage area 41 of the storage portion 40, together with the main scanning position adjustment amount δx and the sub-scanning position adjustment amount δy. However, each of the correction amounts for the third area A3 to the thirteenth area A13 is that assumed for each area which has been set by equally dividing the image formable width WA into 16 parts, and for which adjustment of a region boundary position has not been performed yet. Therefore, the smaller the amount of adjustment for the region boundary position is, the smaller the error is in each of the correction amounts for the third area A3 to the thirteenth area A13.

FIG. 11 is a diagram including tables each showing results of boundary position adjustment processing according to a comparative example. The discloser of the present application has conducted simulation experiments on print sheets of multiple sizes. FIG. 11 shows Table T1 indicating the image width (in mm and dots) corresponding to the size of each print sheet, margin width W (in dots), boundary adjustment distance x (in dot), start-edge side boundary $K_0$, and the total width (in dots), and Table T2c indicating the image width (in dots) of each area of the corresponding print sheet.

The simulation was executed, assuming printing on various print sheets, from SRA3 (supplementary raw format A3) to A6R. In this simulation, the image formable width WA assumes printing of SRA3 size, and the resolution was set to 2400 dpi. Therefore, the image formable width WA includes 32768 pixels (dots) covering 30236 pixels (dots) in the main scanning direction.

That is, a reference number of pixels, $L_0$, (i.e., a width in pixels before boundary position adjustment is performed) of the image adjustment region is set to 2048 pixels (derived by dividing 32768 pixels by 16 areas). The boundary position between adjacent areas of the 16 areas each having the width in pixels of 2048 pixels is a hypothetical boundary position, and is also referred to as an imaginary boundary position. The above-mentioned 16 areas, that is, the first to sixteenth areas, are hypothetical image adjustment regions, and are also referred to as imaginary adjustment regions.

Meanwhile, 240 pixels are assumed for a cycle of the dither matrix. 240 pixels correspond to a cycle assuming the use of a first dither matrix of 16 pixels by 16 pixels, and a second dither matrix of 15 pixels by 15 pixels. The number 240 of the 240 pixels is the least common multiple of 16 (of the 16 pixels), and 15 (of the 15 pixels).

Each of the areas A2 to A15 of the SRA3 size has a width in pixels that is an integral multiple of the cycle of 240 pixels. Specifically, the second area A2 to the eighth area A8 are constituted as the second area A2 (2160 pixels: 9 cycles (=240×9)), the third area A3 (1920 pixels: 8 cycles (=240× 8)), the fourth area A4 (2160 pixels), the fifth area A5 (1920 pixels), the sixth area A6 (2160 pixels), the seventh area A7 (1920 pixels), and the eighth area A8 (2160 pixels). The ninth area A9 to the fifteenth area A15 are configured as repetition of the second area A2 to the eighth area A8. Meanwhile, the first area A1 and the sixteenth area A16 serve as adjustment margins.

On the other hand, the correction amount for each area in the common calibration data is set on the assumption that the image formable region is equally divided into 16 parts by the reference number of pixels $L_0$ (2048 pixels) of the image adjustment region. Therefore, in a printed image for the SRA3 size, an area having the width in pixels of 2160 pixels and an area having the width in pixels of 1920 pixels are arranged alternately. Consequently, the amount of adjustment for the boundary position is to vary periodically. The amount of adjustment for the boundary position is the amount of displacement (in units of pixels) made from the imaginary boundary position to the adjusted boundary position.

Areas A2 to A15 of the other sizes are set by using the respective corresponding areas for the SRA3 size. Specifically, for example, in a printed image region for B4R size, the third area A3 includes the start-edge side boundary, and for the fourth area A4 and the subsequent areas, the width in pixels of each of the corresponding areas for the SRA3 size is used. However, with respect to the position of each of the areas for the SRA3 size, the third area A3 is shifted in the main scanning direction according to the adjustment for the start-edge side boundary. In the present example, gray colored cells in Table T2c all store values generated by shifting the respective areas for the SRA3 size.

The discloser of the present application has found that the amount of adjustment for the boundary position is excessively large in some parts as a result of addition of the periodic variation of the amount of adjustment for the boundary position, and the amount of shift of each area for the SRA3 size. If the amount of adjustment for the boundary position is excessively large, an error in each of the correction amounts may present a problem. Therefore, preferably, the amount of adjustment for the boundary position should be small.

FIG. 12 is a diagram including tables showing adjustment amounts of the boundary position adjustment processing according to the comparative example and the embodiment. FIG. 12 shows Table T3c indicating the adjustment amounts of the boundary position adjustment processing according to the comparative example, and Table T3 indicating the adjustment amounts of the boundary position adjustment processing according to the embodiment. In Table T3c, the amount of adjustment for the first area for the SRA3 size, for example, is −62 (derived from 1986-2048) pixels, and the amount of adjustment for the second area is 50 (derived from 1986+2160−2048×2) pixels. A negative value indicates the adjustment to the left side, and a positive value indicates the adjustment to the right side.

In the comparative example, as can be seen from Table T3c, in A3R and A4E, each of the amounts of adjustment for the fifth area (adjustment amount: −207 pixels) and the seventh area (adjustment amount: −223 pixels) is remarkably large. In B4R, the amount of adjustment for the ninth area (adjustment amount: 211 pixels) is remarkably large. Meanwhile, in B5E and A5R, the adjustment amounts are remarkably large overall. In contrast, in the embodiment, as can be seen from Table T3, the adjustment amount at the maximum is 113 pixels (the twelfth area A12 of A4R and A5E).

FIG. 13 is a diagram including tables each showing results of the boundary position adjustment processing according to the embodiment. In the comparative example, areas A2 to A15 for the sizes other than the SRA3 size are set by using the respective corresponding areas for the SRA3 size. However, in the boundary position adjustment processing according to the embodiment, calculation formulas F1 to F4 are used to individually set the areas. The comparative example and the embodiment are different in the above respect.

Specifically, in a printed image for A3R, for example, in the comparative example, the third area to the fifth area use the respective corresponding areas for the SRA3 size. Thus, the third area is 1920 pixels wide, the fourth area is 2160 pixels wide, and the fifth area is 1920 pixels wide. In contrast, in the boundary position adjustment processing according to the embodiment, the calibration processing portion 11 uses calculation formulas F1 to F4, and it is derived that the third area is 2160 pixels wide, the fourth area is 1920 pixels wide, and the fifth area is 2160 pixels wide.

As a result, the amount of adjustment for the boundary position of the fifth area (at the right side) is reduced remarkably from −207 (derived from 2048+1985+1920+2160+1920−2048×5) pixels to 33 (derived from 2048+1985+2160+1920+2160 2048×5) pixels.

FIG. 14 is a table showing the amounts of adjustment reduction achieved by the boundary position adjustment processing according to the embodiment. Table T4 stores, in each cell, a value obtained by subtracting the absolute value of the numerical value of each cell in Table T3c from the absolute value of the numerical value of each cell in Table T3. As can be seen from Table T4, according to the boundary position adjustment processing of the embodiment, the adjustment amount is less than or equal to that of the comparative example in all of the image adjustment regions.

As described above, with the boundary position adjustment processing according to the embodiment, it is possible to reduce the degree of adjustment for the boundary position in terms of the quantity, and make an error in each correction amount sufficiently small. By this feature, the correction processing portion 12 can use each of the correction amounts for the first area A1 to the sixteenth area A16 for the SRA3 size, which are stored in the calibration data storage area 41 of the storage portion 40, for correcting a printed image for the other size. As a result, in the image forming apparatus 1 according to the embodiment, it is possible to realize a common image region correction table that is applicable to images formed on print sheets of various sizes, whereby a storage area for storing the image region correction table is reduced, and the correction processing is also simplified.

FIG. 15 is a diagram including tables showing the amount of change in a width of each image adjustment region according to the comparative example and the embodiment. Table T5c shows the amount of change in the width of the image adjustment region according to the comparative example. Table T5 shows the amount of change in the width of the image adjustment region according to the embodiment. The discloser of the present application has also found that a variation range of a width in pixels of the image adjustment region according to the embodiment is smaller than that of the comparative example.

Specifically, the variation range of the width of the image adjustment region according to the comparative example is required to be from +112 to −272. Therefore, at least a signed 9-bit region must be secured for one correction area. In contrast, the variation range of the width of the image adjustment region according to the embodiment is from +112 to −128 dots. Therefore, it is sufficient to secure a signed 8-bit region for one correction area. Consequently, it becomes possible to reduce the amount of data of the image region correction table included in the common calibration data.

Furthermore, achieving higher resolution is being pursued for image forming apparatuses, and the number of dither matrices to be arranged in an image formable range has also become enormously large. In view of the above, the discloser of the present application has predicted that the required hardware resources will increase in the future, and conceived the present disclosure in order to reduce the required hardware resources.

In step S500 (FIG. 4), the halftone processing portion 22 executes dither matrix arrangement processing. In the dither matrix arrangement processing, the halftone processing portion 22 arranges the dither matrices DM in the image formation target region WD. Consequently, the halftone processing portion 22 can perform the halftone processing on the image data without disordering the patterns of the dither matrices DM even if sub-scanning position adjustment is performed for each of the image adjustment regions.

In step S600, the correction processing portion 12 executes skew correction. In the skew correction, the correction processing portion 12 uses the correction amount calculated for each image adjustment region, and adjusts the sub-scanning positions of the image adjustment regions of areas other than the reference area such that those sub-scanning positions approximate the sub-scanning position of the reference area.

As described above, the image forming apparatus 1 according to the embodiment can reduce deterioration of the image quality caused by the inclination of the scanning line by simple adjustment processing, reduce a processing cost of the adjustment processing, and also reduce the hardware resources required for that processing.

The present disclosure can be implemented not only in the above-described embodiment, but also in the following modifications.

First modification: In the above embodiment, the deterioration of the image quality caused by the inclination of the scanning line is reduced by the adjustment processing for the respective image adjustment regions in the sub-scanning direction. However, registration adjustment charts including three or more rows of patch groups, for example, may be used to measure curvature of the scanning line. This is because the curvature of the scanning line can be similarly reduced by the adjustment processing for the respective image adjustment regions in the sub-scanning direction, as in the case of reducing the deterioration of the image quality caused by the inclination of the scanning line.

Second modification: In the above embodiment, use of the first dither matrix of 16 pixels by 16 pixels, and the second dither matrix of 15 pixels by 15 pixels is assumed, so that the cycle of the dither matrix is 240 pixels. However, the present disclosure is not limited to the case of using two types of dither matrices. The present disclosure is applicable to image formation processing that uses a single type of dither matrix or three or more types (multiple types) of dither matrices. However, the present disclosure brings about a remarkable advantage when the cycle of dither matrix is large.

What is claimed is:

1. An image forming method which uses a plurality of color materials to form an image based on input image data assuming an image forming medium, which is one of image forming media of multiple sizes, the image forming method comprising:
    executing halftone processing on the input image data by using a plurality of dither matrices;
    performing calibration processing of generating, in order to calculate an amount of color shift that occurs in images formed by the plurality of color materials, common calibration data to be used in common in image formation on the image forming media of multiple sizes, the amount of color shift being calculated for each of a plurality of imaginary adjustment regions that are set by dividing, in a main scanning direction, an image formable width, which is a width in the main scanning direction and along which the image formation is enabled, into a plurality of imaginary image adjustment regions corresponding to the imaginary adjustment regions, respectively;
    performing image region dividing of determining, within the image formable width, a plurality of matrix boundaries corresponding to boundaries between the plurality of dither matrices arranged in an image formation target region, which corresponds to a region in which the image formation is to be performed in the one of image forming media of multiple sizes assumed by the input image data, and an image boundary position that matches with one of the plurality of matrix boundaries, and dividing the image formation target region at each of the determined image boundary positions in the main scanning direction, thereby setting a plurality of image adjustment regions; and
    performing correction processing of using the common calibration data to determine the plurality of imaginary adjustment regions positioned closest to the plurality of image adjustment regions, respectively, according to positions of the plurality of image adjustment regions in the main scanning direction within the image formable width, and using a correction amount for each of the determined imaginary adjustment regions to correct the position of the image adjustment region in a sub-scanning direction for each of the plurality of image adjustment regions, thereby reducing the color shift, wherein
    the image region dividing determines the image boundary position by applying a rounding function to a value obtained by dividing the number of pixels constituting a width of the image adjustment region by the number of pixels in one cycle of the dither matrix in the main scanning direction.

2. The image forming method according to claim 1, wherein the performing image region dividing includes:
    determining a $K_0$-th image adjustment region in which a leading dither matrix among the plurality of dither matrices is to be arranged, $K_0$ being calculated from Int $(W/L_0)+1$, where W represents a distance from a start edge of the image formable width in the main scanning direction to a start edge of the image formation target region, and $L_0$ represents a width of the imaginary adjustment region;
    setting a width of first to $(K_0-1)$-th (where $K_0$ is an integer of 1 or more) image adjustment regions as $L_0$;
    setting a width of the $K_0$-th image adjustment region based on the formula: $x+\text{Round} ((L_0-x)/m)\times m$, where x is W mod $L_0$, and m is the cycle of the dither matrix in the main scanning direction; and
    setting a width of each of $(K_0+1)$-th to K-th (where K is an integer of 2 or more) image adjustment regions based on the formula: $L_k=\text{Round} ((k-k_0+1)\times L_0-(\text{sum of the } K_0\text{-th to }(K-1)\text{-th widths})/m)\times m$.

3. The image forming method according to claim 2, wherein:
    the performing halftone processing executes the halftone processing by using more than one type of dither matrices; and the cycle of the dither matrix in the main scanning direction is a least common multiple of the respective numbers of pixels of the more than one type of dither matrices.

\* \* \* \* \*